(12) United States Patent
Chen et al.

(10) Patent No.: US 10,790,676 B2
(45) Date of Patent: Sep. 29, 2020

(54) FAST CHARGING

(71) Applicant: BEIJING XIAOMI MOBILE SOFTWARE CO., LTD., Beijing (CN)

(72) Inventors: Xingwu Chen, Beijing (CN); Maodong Wu, Beijing (CN); Fenghui Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/553,691

(22) Filed: Aug. 28, 2019

(65) Prior Publication Data
US 2020/0076204 A1 Mar. 5, 2020

(30) Foreign Application Priority Data

Aug. 30, 2018 (CN) .......................... 2018 1 1005322
Aug. 12, 2019 (CN) .......................... 2019 1 0739462

(51) Int. Cl.
*H02J 7/00* (2006.01)
*H01M 10/44* (2006.01)
(52) U.S. Cl.
CPC ........ *H02J 7/00041* (2020.01); *H02J 7/0071* (2020.01); *H01M 10/44* (2013.01)
(58) Field of Classification Search
CPC .......... H02J 7/0003; H02J 7/00; H02J 7/0071; H02J 7/0072; H02J 7/00041; H02J 2207/20; H01M 10/44
USPC ................................................ 320/112, 138
See application file for complete search history.

(56) References Cited

U.S. PATENT DOCUMENTS

2017/0117735 A1 4/2017 Liao
2017/0324241 A1* 11/2017 Lee ..................... H02J 7/0047
2018/0013295 A1 1/2018 Sporck et al.
(Continued)

FOREIGN PATENT DOCUMENTS

CN 106026258 A 10/2016

OTHER PUBLICATIONS

Extended European Search Report issued to EP Application No. 191944743 dated Jan. 16, 2020, (6p).

*Primary Examiner* — Nathaniel R Pelton
(74) *Attorney, Agent, or Firm* — Arch & Lake LLP

(57) ABSTRACT

Fast charging methods, fast charging apparatuses, and machine-readable storage media are provided. The fast charging method includes: in response to detecting a successful handshake with a to-be-charged device, monitoring a voltage request from the to-be-charged device, where the voltage request includes at least a QC3.0 (Quick Charge 3.0) voltage request; when the voltage request is the QC3.0 voltage request, determining a voltage combination of a first data line and a second data line according to respective voltage data of the first data line and the second data line in the QC3.0 voltage request; and when the voltage combination of the first data line and the second data line belongs to a first category valid voltage combination, adjusting a voltage transmitted via an output power line of a charger in a preset fine-tuning charging mode, where a voltage adjustment step size of the fine-tuning charging mode is less than a voltage adjustment step size of a QC3.0 charging mode, and the first category valid voltage combination corresponds to an invalid voltage combination in the QC3.0 charging mode.

20 Claims, 12 Drawing Sheets

(56) References Cited

U.S. PATENT DOCUMENTS

2018/0048170 A1* 2/2018 Sun ........................... H02J 7/00
2018/0131196 A1* 5/2018 Gong ......................... H02J 7/04

* cited by examiner

FAST CHARGING

CROSS REFERENCE TO RELATED APPLICATIONS

This application claims priority to Chinese Patent Application No. 201811005322.X filed on Aug. 30, 2018, and Chinese Patent Application No. 201910739462.8 filed on Aug. 12, 2019, the entire content of which is incorporated herein by reference.

TECHNICAL FIELD

The present disclosure relates to the field of control technology, and in particular to a fast charging method, a fast charging apparatus, and a computer readable storage medium.

BACKGROUND

At present, there are multiple protocols for fast charging technology. A fast charge voltage regulation technology of a Programmable Power Supply (PPS) charging protocol may realize voltage adjustment and current adjustment of 20 mV, 50 mA/Step. However, the voltage regulation technology of a Quick Charge 3.0 (QC3.0) charging protocol can only realize voltage adjustment of 200 mV/Step, which cannot meet a higher precision voltage regulation requirement.

SUMMARY

The present disclosure provides fast charging methods, fast charging apparatuses, and machine-readable storage media.

According to a first aspect of the present disclosure, a fast charging method is provided, which applies to a charger, and the method includes: in response to detecting a successful handshake with a to-be-charged device, monitoring a voltage request from the to-be-charged device, where the voltage request includes at least a Quick Charge 3.0 (QC3.0) voltage request; when the voltage request is the QC3.0 voltage request, determining a voltage combination of a first data line and a second data line according to respective voltage data of the first data line and the second data line in the QC3.0 voltage request; and when the voltage combination of the first data line and the second data line belongs to a first category valid voltage combination, adjusting a voltage transmitted via an output power line of the charger in a preset fine-tuning charging mode, where a voltage adjustment step size of the fine-tuning charging mode is less than a voltage adjustment step size of a QC3.0 charging mode, and the first category valid voltage combination corresponds to an invalid voltage combination in the QC3.0 charging mode.

According to a second aspect of the present disclosure, a fast charging method is provided, which applies to a to-be-charged device, and the method includes: in response to detecting a successful handshake with a charger, monitoring whether the charger supports a fine-tuning charging mode, where a voltage adjustment step size of the fine-tuning charging mode is less than a voltage adjustment step size of a QC3.0 charging mode; when the charger supports the fine-tuning charging mode, sending a QC3.0 voltage request to the charger, wherein the QC3.0 voltage request includes respective voltage data of a first data line and a second data line belonging to a first category valid voltage combination, where the first category valid voltage combination corresponds to an invalid voltage combination in the QC3.0 charging mode; and charging the to-be-charged device according to a voltage transmitted via an output power line from the charger.

According to a third aspect of the present disclosure, a fast charging apparatus is provided, which applies to a charger, and the apparatus includes: a processor; and a memory storing instructions executable by the processor, where the processor is caused by executing the instructions stored in the memory to: in response to detecting a successful handshake with a to-be-charged device, monitor a voltage request from the to-be-charged device, where the voltage request includes at least a QC3.0 voltage request; when the voltage request is the QC3.0 voltage request, determine a voltage combination of a first data line and a second data line according to respective voltage data of the first data line and the second data line in the QC3.0 voltage request; and when the voltage combination of the first data line and the second data line belongs to a first category valid voltage combination, adjust a voltage transmitted via an output power line of the apparatus in a preset fine-tuning charging mode, where a voltage adjustment step size of the fine-tuning charging mode is less than a voltage adjustment step size of a QC3.0 charging mode, and the first category valid voltage combination corresponds to an invalid voltage combination in the QC3.0 charging mode.

According to a fourth aspect of the present disclosure, a fast charging apparatus is provided, which applies to a to-be-charged device, and the apparatus includes: a processor; and a memory storing instructions executable by the processor, where the processor is caused by executing the instructions stored in the memory to: in response to detecting a successful handshake with a charger, monitor whether the charger supports a fine-tuning charging mode, where a voltage adjustment step size of the fine-tuning charging mode is less than a voltage adjustment step size of a QC3.0 charging mode; when the charger supports the fine-tuning charging mode, send a QC3.0 voltage request to the charger, where the QC3.0 voltage request includes respective voltage data of a first data line and a second data line belonging to a first category valid voltage combination, where the first category valid voltage combination corresponds to an invalid voltage combination in the QC3.0 charging mode; and charge the apparatus according to a voltage transmitted via an output power line from the charger.

According to a fifth aspect of the present disclosure, a non-transitory machine-readable storage medium is provided, the non-transitory machine-readable storage medium storing computer instructions, where the instructions are executed by a processor to implement the methods of the first aspect.

According to a sixth aspect of the present disclosure, a non-transitory machine-readable storage medium is provided, the non-transitory machine-readable storage medium storing computer instructions, where the instructions are executed by a processor to implement the method of the first second aspect.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples

DETAILED DESCRIPTION

Figure 1:
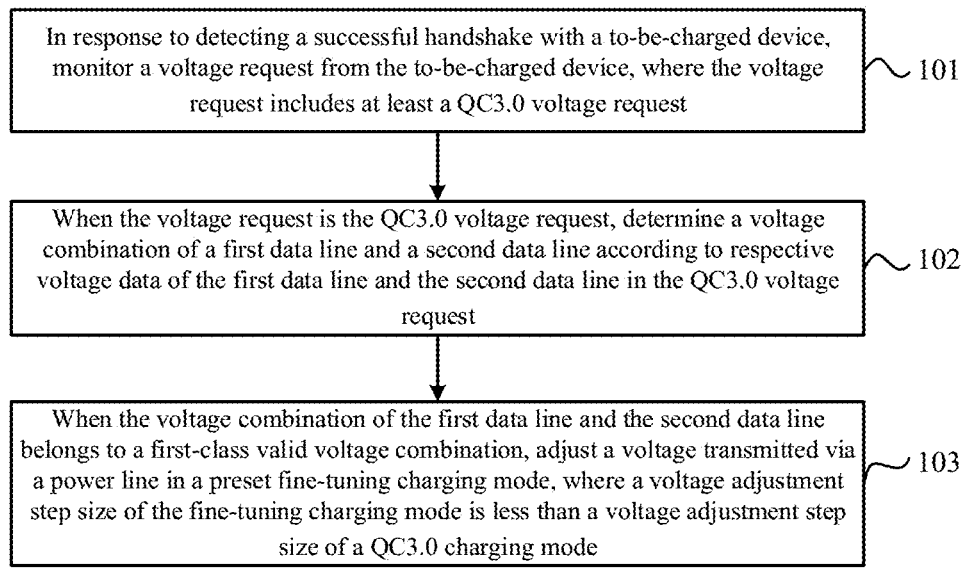
FIG. 1 is a flowchart illustrating a fast charging method according to an example of the present disclosure.

Reference is made in detail to exemplary aspects, examples of which are illustrated in the accompanying drawings. The following description refers to the accompanying drawings in which the same or like numerals in different drawings represent the same or similar elements unless otherwise indicated. The implementations set forth in the following description of exemplary aspects do not represent all implementations consistent with the disclosure. Instead, they are merely examples of apparatuses and methods consistent with aspects related to the disclosure.

The terminology used in the present disclosure is for the purpose of describing particular examples only and is not intended to limit the present disclosure. As used in this disclosure and the appended claims, the singular forms "a", "an", and "the" are intended to include the plural forms as well, unless the context clearly indicates otherwise. It should also be understood that the term "and/or" as used herein refers to and includes any and all possible combinations of one or more of the associated listed items.

It should be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

At present, a fast charge voltage regulation technology of a PPS charging protocol may realize voltage adjustment and current adjustment of 20 mV, 50 mA/Step. However, a voltage regulation technology of a QC3.0 charging protocol can only realize voltage adjustment of 200 mV/Step, and a charging technology of a QC2.0 charging protocol only supports fixed voltage charging, thus, the existing QC2.0/QC3.0 charging protocols cannot meet a higher precision voltage regulation requirement.

Thus, an example of the present disclosure provides a fast charging method, which may be applied to a charger and a to-be-charged device. After a handshake is successful, the charger and the to-be-charged device may determine that they are respective compatible with the QC2.0 and/or QC3.0 charging modes, and then, the charger may determine whether a voltage request sent by the to-be-charged device is a QC3.0 voltage request.

If the voltage request is the QC3.0 voltage request, the charger determines whether a voltage combination of a first data line (D+, hereinafter referred to as DP) and a second data line (D−, hereinafter referred to as DM) is a first category valid voltage combination representing a fine-tuning charging mode or a second category valid voltage combination representing a QC3.0 charging mode. Then the charger adjusts an output voltage of an output power line according to a voltage adjustment step corresponding to the fine-tuning charging mode or the QC3.0 charging mode.

In this disclosure, the first category valid voltage combination may be complementary to the second category valid voltage combination, that is, the first category valid voltage combination may be a corresponding invalid voltage combination in the QC3.0 charging mode to achieve the purpose of increasing utilization rates of the first data line and the second data line. Since the voltage adjustment step size in the QC3.0 charging mode is 200 mV, the voltage adjustment step size of the fine-tuning charging mode in this disclosure may be less than 200 mV, for example, 12.5 mV, thereby meeting the requirement of adjusting the charging voltage with higher precision.

FIG. 1 is a flowchart illustrating a fast charging method according to an example. As shown in FIG. 1, the fast charging method is applied to a charger and includes steps 101-103.

At step 101, in response to detecting a successful handshake with a to-be-charged device, a voltage request from the to-be-charged device is monitored, where the voltage request includes at least a QC3.0 voltage request.

Figure 2:
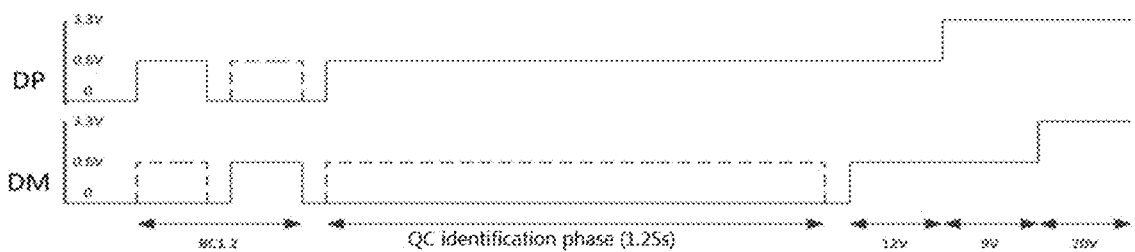
FIG. 2 is a waveform diagram of a fast charging handshake according to an example of the present disclosure.

In this example, a fast charge handshake is performed after the to-be-charged device is connected with the charger. A fast charge handshake process may be referred to a handshake process of the QC3.0 charging mode. As shown in FIG. 2, the process includes the followings.

Figure 3:
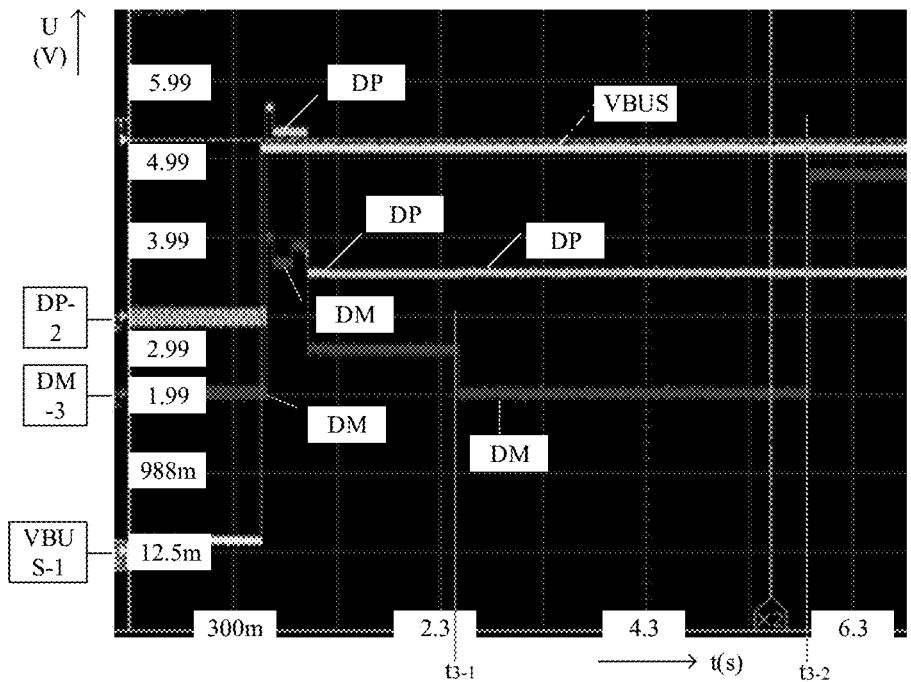
FIG. 3 is a schematic diagram illustrating a detection result of a QC3.0 state according to an example of the present disclosure.

The to-be-charged device firstly performs detection for a Battery Charging Specification Revision 1.2 (BC1.2) protocol, and outputs a first voltage value (0.6 V) on a first data line DP of a charging cable when identifying a Dedicated Charging Port (DCP) mode (500 mA-1.5 A). When detecting that the first data line DP being at the first voltage value continues for 1.25 second, the charger disconnects a short connection between the first data line DP and a second data line DM, and connects the second data line DM with a pull-down resistor of 20 K ohm, thereby decreasing the voltage of the second data line DM to 0 V. In this way, the fast charge handshake between the to-be-charged device and the charger is successful. Afterwards, the charger enters a QC3.0 state, and a detection result of the QC3.0 state is as shown in FIG. 3. In FIG. 3, a marker VBUS-1 and a corresponding short line refers to that a 0V voltage of the output power line VBUS is located at a position indicated by the short line. A marker DM-3 and a corresponding short line refers to that a 0V voltage of the second data line DM is located at a position indicated by the short line. A marker DP-2 and a corresponding short line refers to that a 0V voltage of the first data line DP is located at a position indicated by the short line. The VBUS-1, the DM-3, the DP-2, and the corresponding short lines shown in the subsequent figures have same meanings. In FIG.3 and the subsequent figures, voltages of the DM-3 and the DP-2 are both set to 1V per grid, so that rough calculations may be performed based on the position of 0V voltage and the settings of 1V per grid. Voltage markings at the left side of each figures refer to the voltage level of the VBUS. In some figures, the position of a 0V voltage of the VBUS goes beyond a display range of an oscilloscope.

In FIG. 3, at time t3-1, the charger completes a QC identification phase. At time t3-2, the charger enters a QC3.0 state. Specifically, a QC3.0 continuous mode is entered. When detecting that a voltage value of the DP is about 0.6 V and a voltage value of the DM is about 3.3 V, the charger enters the QC3.0 continuous mode. It is to be noted that the fine-tuning charging mode of the present disclosure is realized only in the QC3.0 continuous mode.

The above charging cable, the to-be-charged device and the charger may be a charging cable, a to-be-charged device and a charger, all of which support USB (Universal Serial Bus) 2.0/USB3.0. The charging cable includes two data lines, DP and DM, and signal transmission directions of the DP and DM are both from the to-be-charged device to the charger. The charging cable further includes an output power line VBUS and a ground line, and signal transmission directions of the output power line VBUS is from the charger to the to-be-charged device. Similarly, USB interfaces of the to-be-charged device and the charger also include these four signals. A DP in the USB interface of the to-be-charged device is connected with a DP in the USB interface of the charger through the charging cable, a DM in the USB interface of the to-be-charged device is connected with a DM in the USB interface of the charger through the charging cable, a VBUS in the USB interface of the to-be-charged device is connected with a VBUS in the USB interface of the charger through the charging cable, and a ground in the USB interface of the to-be-charged device is connected with a ground in the USB interface of the charger through the charging cable. According to different USB interface protocols, such as mini-USB, micro-USB and type-C protocols, the charging cable may further include other signal lines, but as long as there are DP, DM, VBUS and ground lines, the method of the present disclosure may be implemented.

After the fast charge handshake is successful, the charger may receive a voltage request from the to-be-charged device, where the voltage request may be a QC3.0 voltage request or a QC2.0 voltage request.

It is to be noted that the charger may obtain the voltage request by detecting the respective voltages of the first data line DP and the second data line DM, and may also obtain the voltage request by detecting a data packet transmitted via the first data line DP. In an example, the data packet may include at least two groups of pulse data with an interval of a set time length. The first group of pulse data indicates an output voltage value of the charger, and the second group of pulse data indicates a limiting value of an output current of the charger. Those skilled in the art may select an appropriate detection manner according to a specific scenario, which is not limited herein.

At step 102, when the voltage request is the QC3.0 voltage request, a voltage combination of the first data line and the second data line is determined according to respective voltage data of the first data line and the second data line in the QC3.0 voltage request.

When the voltage request of the to-be-charged device is the QC3.0 voltage request, the voltage combination of the first data line and the second data line may be determined by detecting the voltage values of the first data line DP and the second data line DM in the QC3.0 voltage request.

In this example, the voltage combination of the first data line and the second data line may belong to a first category valid voltage combination, a second category valid voltage combination or another combination.

In an example, the first category valid voltage combination may include the following combinations:

In a first voltage combination, the voltage transmitted via the output power line VBUS is increased with the voltage adjustment step size of the fine-tuning charging mode. In the first voltage combination, the second data line DM transmits a first negative voltage pulse (from 3.3 V to 0.6 V) and the first data line DP transmits N number of second positive voltage pulses (from 0.6 V to 3.3 V), where a width of the first negative voltage pulse is greater than a width of the N number of the second positive voltage pulses, and the number of output voltage adjustments is same as the number N of the second positive voltage pulses.

In a second voltage combination, the voltage transmitted via the output power line is decreased with the voltage adjustment step size of the fine-tuning charging mode. In the second voltage combination, the second data line DM transmits N number of second negative voltage pulses (from 3.3 V to 0.6 V) and the first data line DP transmits a first positive voltage pulse (from 0.6 V to 3.3 V), where a width of the first positive voltage pulse is greater than a width of the N number of the second negative voltage pulses, and the number of output voltage adjustments is same as the number N of the second negative voltage pulses.

In a third voltage combination, the voltage transmitted via the output power line is increased with the voltage adjustment step size of the fine-tuning charging mode. In the third voltage combination, the first data line DP transmits N number of second negative voltage pulses (from 3.3 V to 0.6 V) and the second data line DM transmits a first voltage value (0.6 V), where the number of output voltage adjustments is same as the number N of the second negative voltage pulses.

In a fourth voltage combination, the voltage transmitted via the output power line is decreased with the voltage adjustment step size of the fine-tuning charging mode. In the fourth voltage combination, the first data line DP transmits a second voltage value (3.3 V) and the second data line DM transmits N number of second positive voltage pulses (from 0.6 V to 3.3 V), where the number of output voltage adjustments is same as the number N of the second positive voltage pulses.

In a fifth voltage combination, the second data line DM transmits the first voltage value (0.6 V) and the first data line DP transmits at least two groups of voltage pluses, that is, two groups of pulse data forming a data packet, where each group includes a plurality of third negative voltage pulses (from 3.3 V to 0.6 V).

It is to be noted that since the fine-tuning charging mode is run under the QC3.0 voltage request, the voltage combination of the first data line DP and the second data line DM corresponding to the fine-tuning charging mode is an invalid voltage combination in a standard QC3.0 state. In the present disclosure, in view of a filtering operation in the QC3.0 state, a time interval between a first voltage change (e.g., a first rising edge or falling edge) on the first data line DP and a first voltage change (e.g., a first falling edge or rising edge) on the second data line DM is less than a filtering time defined in the continuous mode of the QC3.0 charging mode. In this way, it is ensured that the voltages on the first data line DP and the second data line DM are not considered as invalid voltages.

In an example, the second category valid voltage combination may be a voltage combination corresponding to an existing QC3.0 charging mode, so that the to-be-charged device is charged based on the existing QC3.0 charging mode and the voltage adjustment step size is 200 mV. The voltage combination and the adjustment process of the existing QC3.0 charging mode may be referred to a QC3.0 protocol.

In an example, another voltage combination may be as follows: the voltage of the first data line DP is lower than a third voltage value (0.325 V), or the voltages of the first data line DP and the second data line DM indicate a state of QC2.0 5V (a fourth voltage). In this voltage combination, both the fine-tuning charging mode and the QC3.0 state are exited. The QC2.0 5V indicates a 5V mode of a QC2.0 charging mode. The fourth voltage refers to that the voltage value of the first data line DP is 0.6 V and the voltage value of the second data line DM is 0 V.

At step 103, when the voltage combination of the first data line and the second data line belongs to the first category valid voltage combination, a voltage transmitted via the output power line is adjusted in a preset fine-tuning charging mode, so as to charge the to-be-charged device, where the voltage adjustment step size of the fine-tuning charging mode is less than the voltage adjustment step size of the QC3.0 charging mode.

In this example, if the charger determines that the voltage combination of the first data line DP and the second data line DM belongs to the first category valid voltage combination, the voltage of the output power line is adjusted in the preset fine-tuning charging mode, so as to charge the to-be-charged device, where the voltage adjustment step size of the fine-tuning charging mode is less than the voltage adjustment step size of the QC3.0 charging mode. In an example, the voltage adjustment step size of the fine-tuning charging mode is 12.5 mV. Then, the charger increases or decreases the output voltage of the output power line based on the voltage adjustment step size of 12.5 mV.

Thus, the invalid voltage combination in the QC3.0 charging mode may be used as the first category valid voltage combination corresponding to the fine-tuning charging mode. Different voltage combinations of the first data line and the second data line are fully utilized in this example. In this way, a utilization rate of the voltage combination can be increased, and the voltage of the output power line is adjusted with a voltage adjustment step size different from that of the QC3.0 charging mode, thereby achieving coarse-tuning or fine-tuning of the charging voltage and satisfying scenarios with different charging requirements. In addition, existing charging cables and interfaces do not need to be upgraded in this example, and the charger using this method is also compatible with to-be-charged devices only supporting the QC2.0/QC3.0 protocols. The method of the present disclosure is applicable to USB interfaces, such as mini-USB, micro-USB and type-C, and supports USB2.0/USB3.0 protocols.

Figure 4:
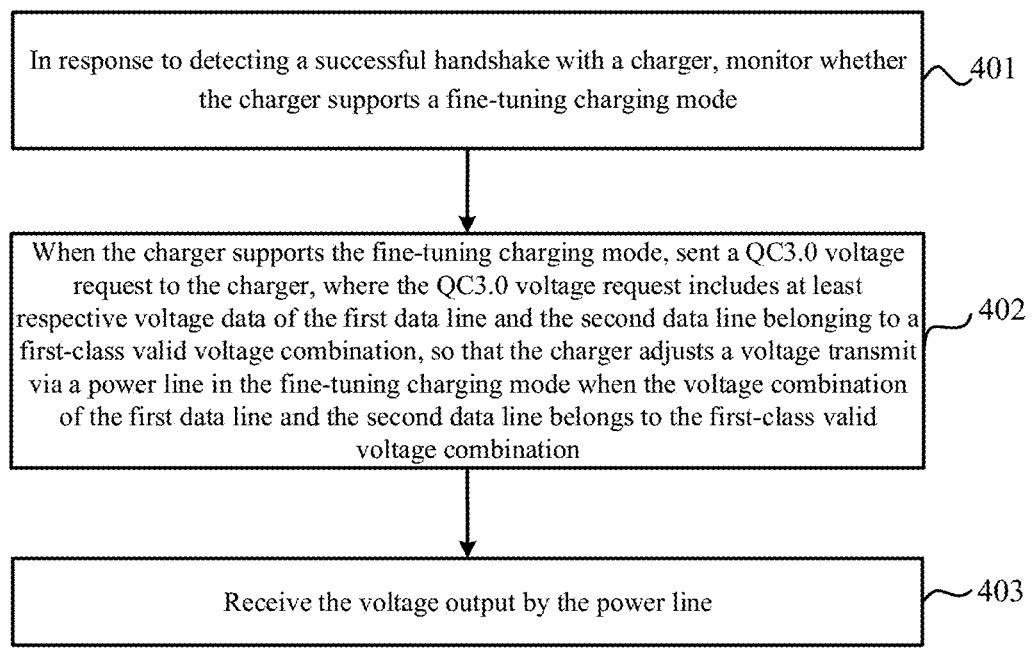
FIG. 4 is a flowchart illustrating a fast charging method according to another example of the present disclosure.

An example of the present disclosure also provides a fast charging method applied to a to-be-charged device. FIG. 4 is a flowchart illustrating a fast charging method according to an example of the present disclosure. As shown in FIG. 4, the fast charging method includes steps 401-403.

At step 401, in response to detecting a successful handshake with a charger, whether the charger supports a fine-tuning charging mode is monitored.

In this example, after detecting a connection with the charger, the to-be-charged device performs a fast charge handshake. A handshake process may be referred to the contents at the step 101, which will not be described again.

Then, the to-be-charged device monitors whether the charger supports a QC3.0 charging mode and a fine-tuning charging mode. For example, after being connected with the charger, the to-be-charged device enters a QC3.0 continuous mode. When the DP is set to 0.6 V and the DM is set to 3.3 V, the to-be-charged device enters the QC3.0 continuous mode. The to-be-charged device sends a voltage combination of the DP and the DM in the continuous mode, and then detects whether the voltage of the output power line VBUS is adjusted with 200 mV/Step. If the stepped voltage adjustment is performed at the VBUS, it is considered that the charger supports the QC3.0 charging mode.

Then, the to-be-charged device may request to enter the fine-tuning charging mode for increasing or decreasing a voltage. The to-be-charged device may output a voltage combination belonging to a first category valid voltage combination on the DP and the DM after entering the QC3.0 continuous mode, and monitor whether the voltage of the VBUS is fine-tuned according to the voltage combination. If the voltage is fine-tuned, it indicates that the charger supports the fine-tuning charging mode, and steps 402-403 may be continued. If the voltage is unchanged, it indicates that the charger does not support the fine-tuning charging mode. In this case, a charge management may be performed for the to-be-charged device and the charger according to a QC3.0 protocol, and steps 402-403 are no longer performed.

At step 402, when the charger supports the fine-tuning charging mode, a QC3.0 voltage request is sent to the charger, where the QC3.0 voltage request includes at least voltage data of the first data line and the second data line belonging to a first category valid voltage combination, so that the charger adjusts a voltage of the output power line in the fine-tuning charging mode when the voltage combination of the first data line and the second data line belongs to the first category valid voltage combination.

The to-be-charged device sends the voltage request to the charger according to the desired charging mode. For example, when detecting that the charger supports the QC3.0 charging mode, the to-be-charged device sends the QC3.0 voltage request to the charger. In additional, the to-be-charged device may also send another voltage request, for example, a QC2.0 voltage request, to the charger.

In an example, the to-be-charged device sends the QC3.0 voltage request through the first data line DP and the second data line DM of the charging cable between the to-be-charged device and the charger. The voltage combination of the first data line DP and the second data line DM may represent the QC3.0 voltage request. The voltage combination of the first data line DP and the second data line DM may belong to the first category valid voltage combination, a second category valid voltage combination or another combination. Step 102 specifies contents relating to the classification of voltage combinations, the first category valid voltage combination, the second category valid voltage combination and another combination, which will not be described again.

In another example, the to-be-charged device transmits a data packet to the charger through the first data line DP. The data packet includes at least two groups of pulse data with an interval of a set time length. The first group of pulse data indicates an output voltage value of the charger, and the second group of pulse data indicates a limiting value of an output current of the charger. The data packet may further include pulse data containing other communication information, and those skilled in the art may set the data packet according to a specific scenario, which is not limited herein.

Meanwhile, the charger may adjust the output voltage of the output power line in the charging cable with a corresponding mode by detecting the voltage combination of the first data line DP and the second data line DM. For example, when the voltage combination of the first data line DP and the second data line DM belongs to the first category valid voltage combination, the charger adjusts the voltage of the output power line with the preset fine-tuning charging mode. In the fine-tuning charging mode, the output voltage of the output power line is adjusted with a voltage adjustment step size less than that of the QC3.0 charging mode. The voltage adjustment step size of the fine-tuning charging mode is 12.5 mV in this example. For another example, when the voltage combination of the first data line DP and the second data line DM belongs to the second category valid voltage combination, the charger adjusts the voltage of the output power line with the QC3.0 charging mode, where the voltage adjustment step size of the QC3.0 charging mode is 200 mV.

At step 403, the voltage output by the output power line is received.

In this example, the to-be-charged device is charged by the received voltage of the output power line.

Thus, the invalid voltage combination in the QC3.0 charging mode may be used as the first category valid voltage combination corresponding to the fine-tuning charging mode. Different voltage combinations of the first data line and the second data line are fully utilized in this example. In this way, a utilization rate of the voltage combination can be increased, and the voltage of the output power line is adjusted with the voltage adjustment step size different from that of the QC3.0 charging mode, thereby achieving the fine-tuning of the charging voltage and satisfying scenarios with more precise charging requirements.

A fast charging method according to some examples of the present disclosure will be described below.

EXAMPLE 1

In this example, the voltage of the output power line (VBUS) is adjusted by a fast charging method, including increasing voltage and decreasing voltage.

1. The voltage of the output power line is increased in the fine-tuning charging mode.

Figure 5:
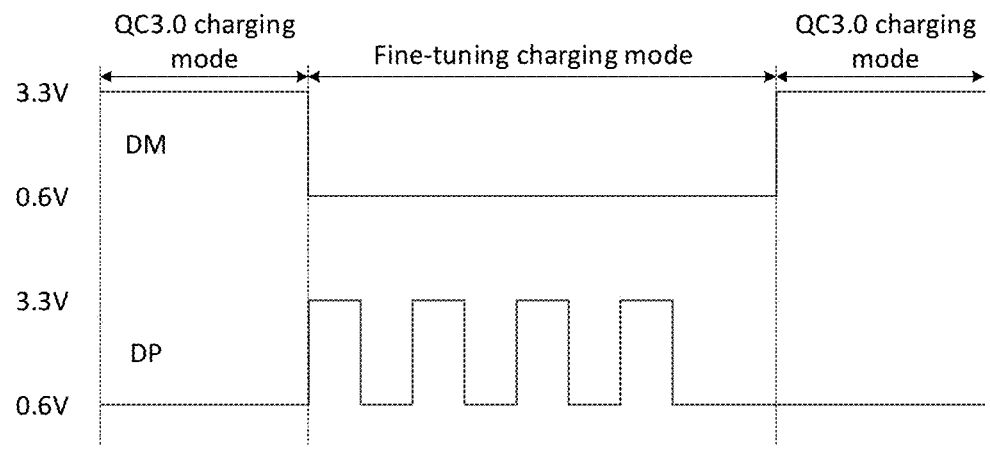
FIG. 5 is a voltage-increasing waveform diagram of a fine-tuning charging mode according to a first example of the present disclosure.

As shown in FIG. 5, if desiring to adopt a QC3.0 charging mode, a to-be-charged device controls the first data line DP to output a voltage of 0.6 V and controls the second data line DM to output a voltage of 3.3 V. The respective voltages of the DP and the DM are adjusted based on a QC3.0 standard voltage adjustment instruction.

With reference to FIG. 5, if desiring to adopt the fine-tuning charging mode, the to-be-charged device sends a QC3.0 voltage request to the charger, e.g., the first data line DP transmits N number of second positive voltage pulses (from 0.6 V to 3.3 V), and the second data line DM transmits a first negative voltage pulse (from 3.3 V to 0.6 V) at the same time. The width of the first negative voltage pulse is greater than the width of the N number of the second positive voltage pulses.

Figure 6:
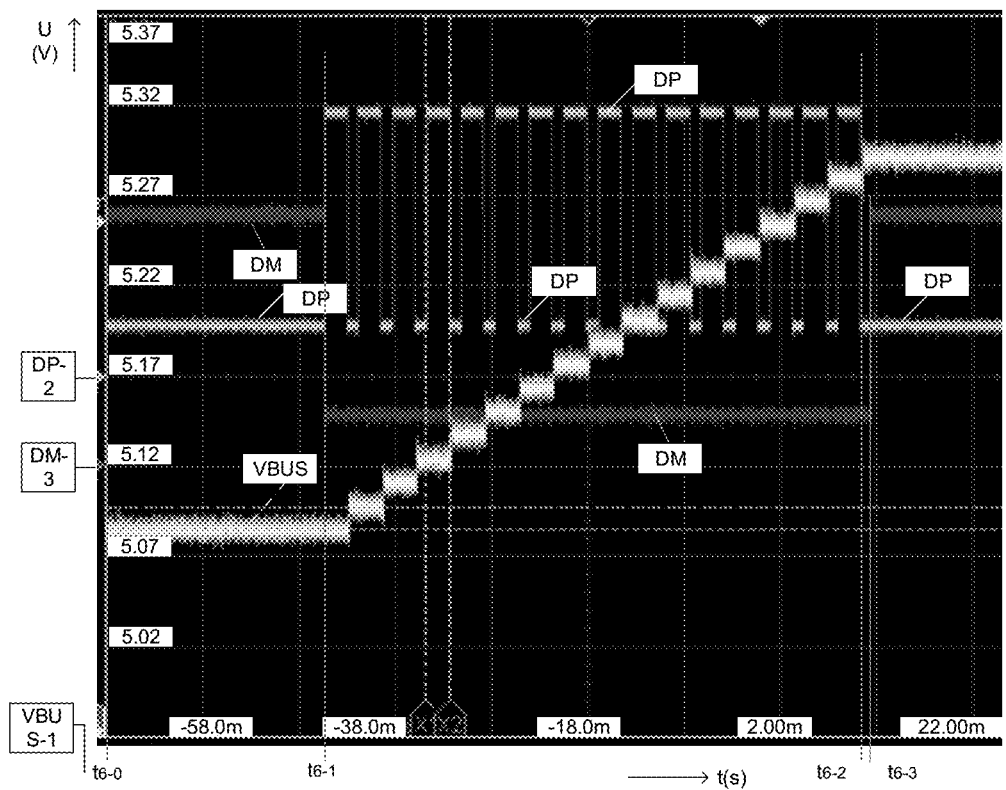
FIG. 6 is a schematic diagram illustrating a voltage-increasing effect according to a first example of the present disclosure.

According to the voltage combination of the DP and the DM in FIG. 5, a charging effect is shown in FIG. 6. As shown in FIG. 6, after time t6-0, the voltage on the second data line DM is about 2.8 V (a measured output voltage value is less than the actual output voltage value due to a voltage drop caused by a cable and other issues). After time t6-1, the voltage on the second data line DM changes to 0.6 V. After time t6-3, the voltage on the second data line DM is about 2.8 V. Thus, the second data line DM transmits the first negative voltage pulse in the duration from the time t6-1 to the time t6-3. Further, as shown in FIG. 6, after the time t6-0, the voltage on the first data line DP is about 0.6 V. After the time t6-1, the first data line DP transmits 16 second positive voltage pulses. After the time t6-2, the voltage on the first data line DP is about 0.6 V. Thus, the first data line DP transmits 16 the second positive voltage pulses in the duration from the time t6-1 to the time t6-2 while the second data line DM transmits the first negative voltage pulse.

According to the voltage combination of the first data line DP and the second data line DM, the charger adjusts the voltage of the output power line VBUS by increasing 12.5 mV per voltage adjustment step corresponding to each second positive voltage pulse (16*12.5 mV=200 mV). In this process, the voltage of the VBUS is adjusted from 5.10 V to 5.30 V.

In addition, the charger does not exit from the QC3.0 state during the process which the first data line DP transmits the N number of the second positive voltage pulses while the second data line DM transmits the first negative voltage pulse in this example.

Figure 7:
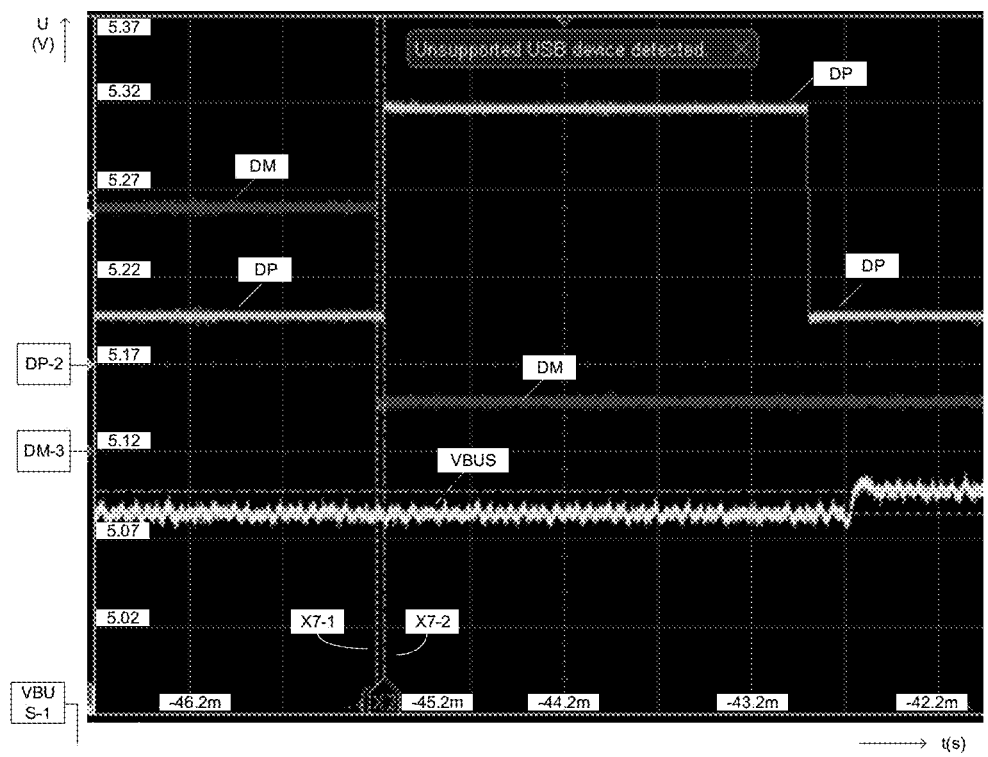
FIG. 7 is a schematic diagram illustrating a time sequence of a first data line and a second data line during a voltage-increasing process according to a first example of the present disclosure.

Although in FIG. 6, it is shown that the second data line DM and the first data line DP are simultaneously flipped at the time t6-1, this is actually caused by a setting of a time resolution of an oscilloscope. The time resolution may be adjusted from 10 ms per grid to 500 µs per grid to show the details at the time t6-1. As shown in FIG. 7, a time of changing the voltage on the second data line DM from a high level (2.8 V) to a low level (0.6 V) is X7-1, a time of changing the voltage on the first data line DP from the low level (0.6 V) to the high level (3.0 V) is X7-2, and a time interval between the time X7-1 and the time X7-2 needs to be less than a minimum value of filtering time associated with the QC3.0 continuous mode, that is, the time interval from a falling edge of the first negative voltage pulse transmitted via the second data line DM to a first rising edge of the second positive voltage pulses transmitted via the first data line DP is less than a minimum value of filtering time defined in a continuous mode of the QC3.0 charging mode. Otherwise, the charger will identify the voltage combination of the DM and the DP as a voltage decrease situation of the QC3.0 mode. In an example, the minimum value of the filtering time associated with the continuous mode is 100 µs. In FIG. 7, the time interval is about 40 µs which meets the above requirement.

2. The voltage of the output power line is decreased in the fine-tuning charging mode.

Figure 8:
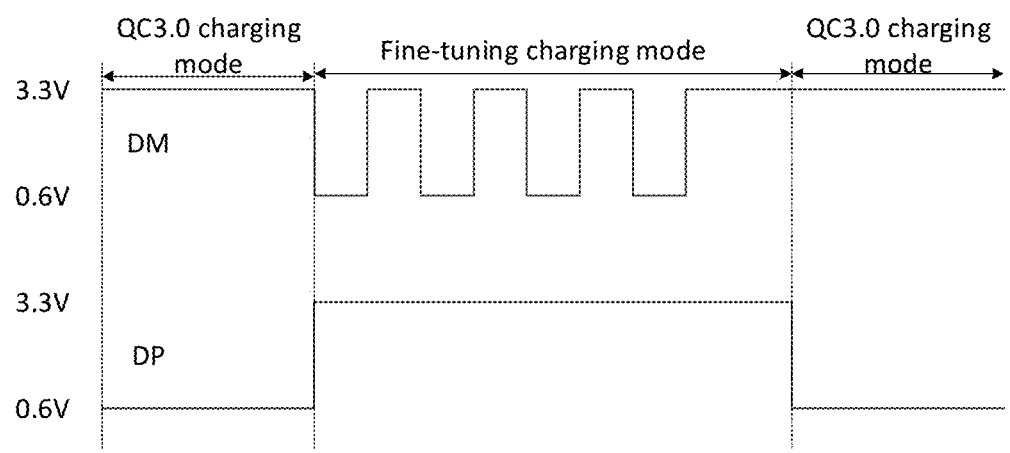
FIG. 8 is a voltage-decreasing waveform diagram of a fine-tuning charging mode according to a first example of the present disclosure.

As shown in FIG. 8, if desiring to adopt the QC3.0 charging mode, the to-be-charged device controls the first data line DP to output the voltage of 0.6 V and controls the second data line DM to output the voltage of 3.3 V.

With reference to FIG. 8, if desiring to adopt the fine-tuning charging mode, the to-be-charged device sends the QC3.0 voltage request to the charger, e.g., the first data line DP transmits the first positive voltage pulse (from 0.6 V to 3.3 V), and the second data line DM transmits N number of second negative voltage pulses (from 3.3 V to 0.6 V) at the same time. The width of the first positive voltage pulse is greater than the width of the N number of the second negative voltage pulses.

Figure 9:
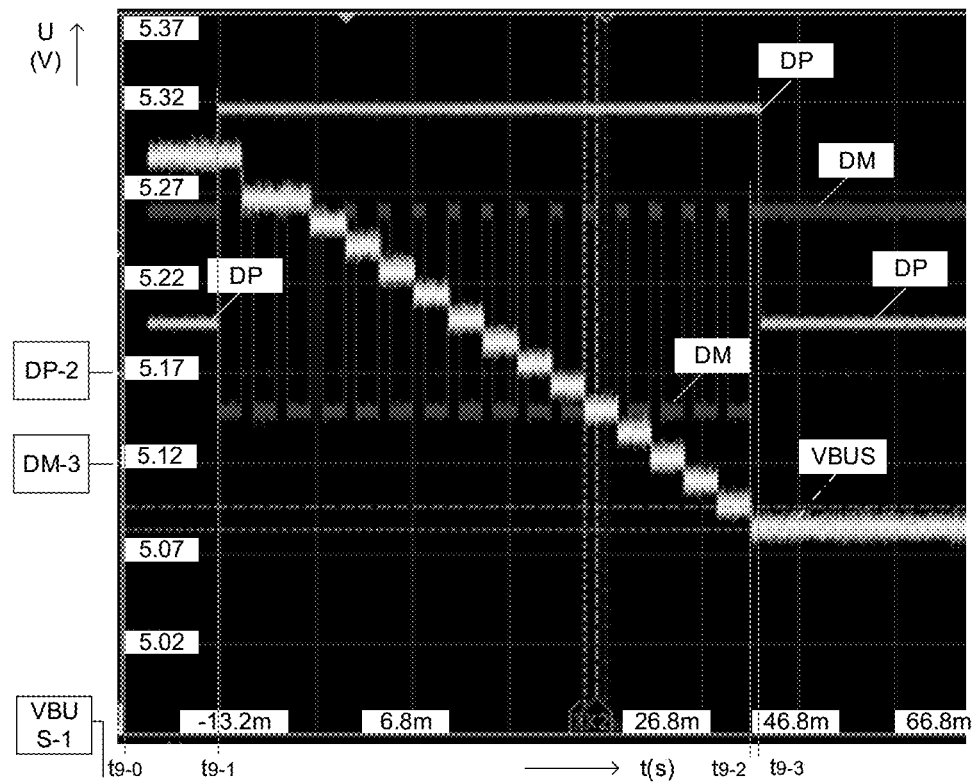
FIG. 9 is a schematic diagram illustrating a voltage-decreasing effect according to a first example of the present disclosure.

According to the voltage combination of the DP and the DM in FIG. 8, a charging effect is shown in FIG. 9. As shown in FIG. 9, after time t9-0, the voltage on the second data line DM is about 2.8 V. After time t9-1, the second data line DM transmits 16 second negative voltage pulses. After time t9-2, the voltage on the second data line DM is about 2.8 V. Thus, the second data line DM transmits 16 negative voltage pulses. Further, as shown in FIG. 9, after the time t9-0, the voltage on the first data line DP is about 0.6 V. After the time t9-1, the voltage on the first data line DP is about 3 V. After the time t9-3, the voltage on the first data line DP is about 0.6 V. Thus, the first data line DP transmits the first positive voltage pulse in the duration from the time t9-1 to the time t9-3. In this way, the second data line DM transmits 16 second negative voltage pulses while the first data line DP transmits the first positive voltage pulse.

According to the voltage combination of the first data line DP and the second data line DM, the charger adjusts the voltage of the output power line VBUS by decreasing 12.5 mV per voltage adjustment step corresponding to each second negative voltage pulse (16*12.5 mV=200 mV). In this process, the voltage of the VBUS is adjusted from 5.30 V to 5.10 V.

In addition, the charger does not exit from the QC3.0 state during the process which the second data line DM transmits the N number of the second negative voltage pulses while the first data line DP transmits the first positive voltage pulse in this example.

Figure 10:
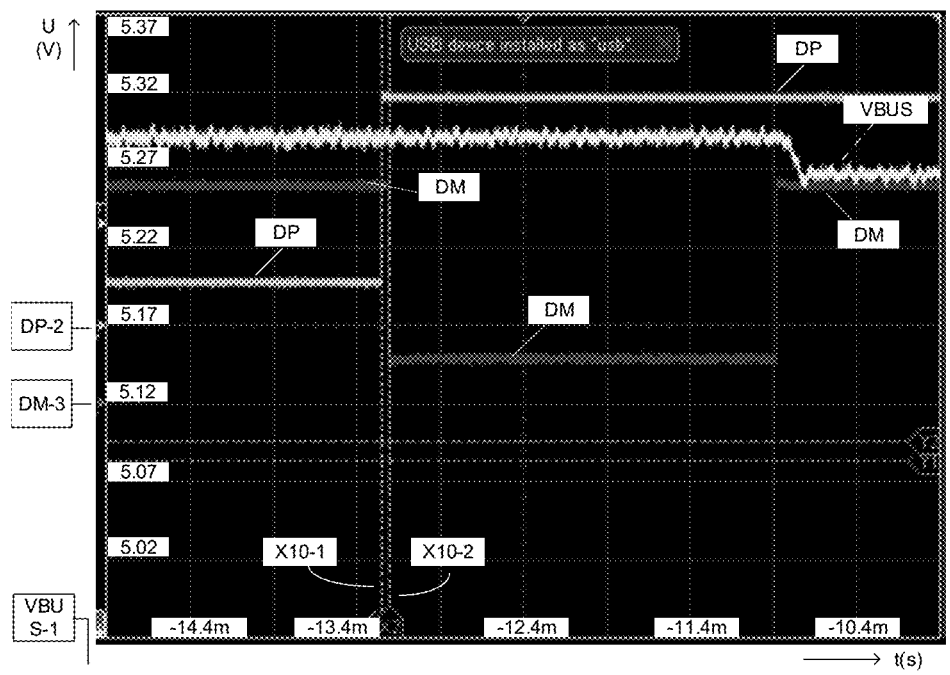
FIG. 10 is a schematic diagram illustrating a time sequence of a first data line and a second data line during a voltage-decreasing process according to a first example of the present disclosure.

Although in FIG. 9, it is shown that the second data line DM and the first data line DP are simultaneously flipped at the time t9-1, this is actually caused by a setting of a time resolution of an oscilloscope. The time resolution may be adjusted from 10 ms per grid to 500 µs per grid to show the details at the time t9-1. As shown in FIG. 10, a time of changing the voltage on the second data line DM from the high level (2.8 V) to the low level (0.6 V) is X10-2, a time of changing the voltage on the first data line DP from the low level (0.6 V) to the high level (3.0 V) is X10-1, and a time interval between the time X10-1 and the time X10-2 needs to be less than the minimum value of filtering time associated with the QC3.0 continuous mode, that is, the time interval from a rising edge of the first positive voltage pulse transmitted via the first data line DP to a first falling edge of the second negative voltage pulses transmitted via the second data line DM is less than the minimum value of the filtering time defined in the continuous mode of the QC3.0 charging mode. Otherwise, the charger may identify the voltage combination of the DM and the DP as a voltage increase situation of the QC3.0 mode. In an example, the minimum value of the continuous-mode filtering time is 100 µs. In FIG. 10, the time interval is about 40 µs which meets the above requirement.

In this example, when the voltage on the second data line DM is changed from 3.3 V to 0.6 V, the first data line DP transmits the second positive voltage pulses. In this case, the QC3.0 charging mode identifies the voltage combination of the DP and the DM as an invalid voltage combination and does not respond, but the fine-tuning charging mode of the present disclosure may identify the voltage combination and increase the voltage of the VBUS. When the second data line DM transmits the second negative voltage pulses and the voltage on the first data line DP is changed from 0.6 V to 3.3 V, the QC3.0 charging mode identifies the voltage combination of the DP and the DM as the invalid voltage combination and does not respond, but the fine-tuning charging mode of the present disclosure may identify the voltage combination and decrease the voltage of the VBUS.

3. The fine-tuning charging mode is exited.

When the voltage on the first data line DP is lower than 0.325 V, the fine-tuning charging mode and the QC3.0 state are exited.

Figure 11:
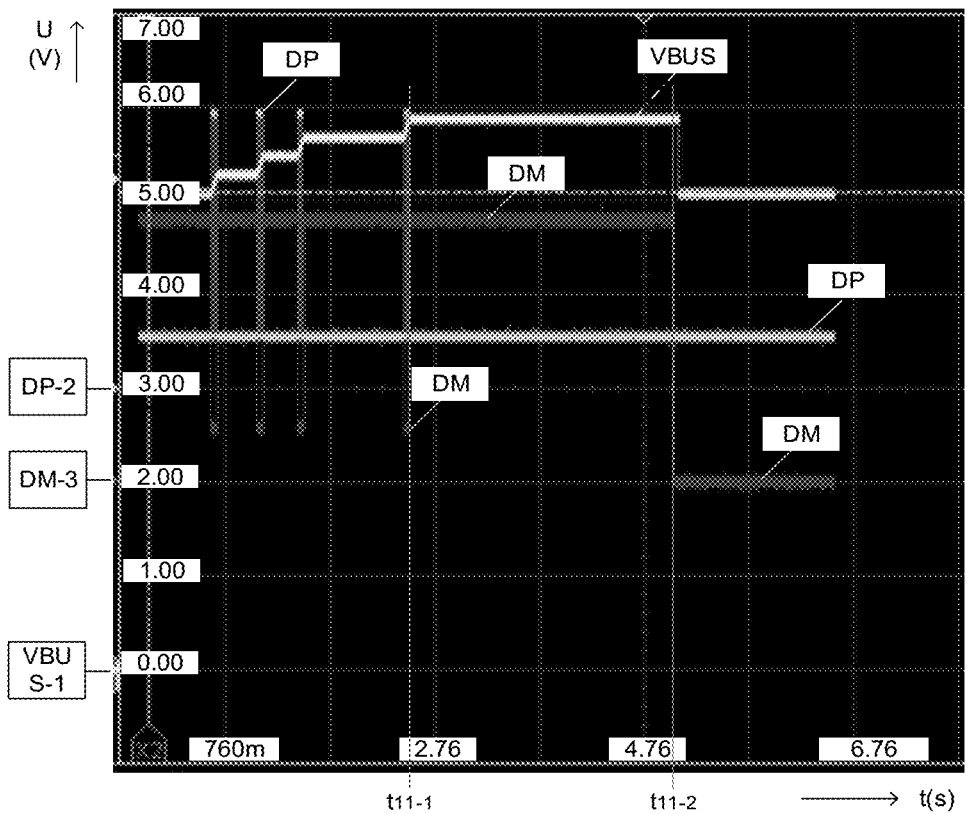
FIG. 11 is a schematic diagram illustrating a time sequence for exiting a fine-tuning charging mode during a voltage-increasing process according to a first example of the present disclosure.

As shown in FIG. 11, after time t11-2, the first data line DP and the second data line DM return to a state indicating QC2.0 5V, then the fine-tuning charging mode and the QC3.0 state are exited, and the voltage of the output power line VBUS is changed from a voltage-increasing state to 5V.

Figure 12:
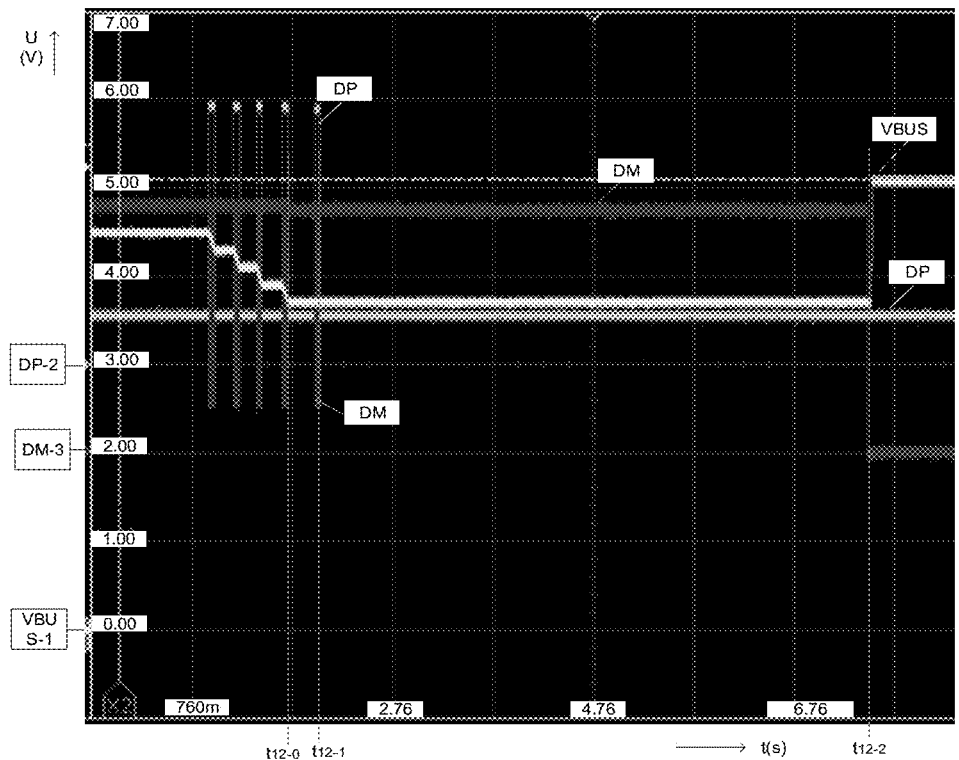
FIG. 12 is a schematic diagram illustrating a time sequence for exiting a fine-tuning charging mode during a voltage-decreasing process according to a first example of the present disclosure.

As shown in FIG. 12, after time t12-2, the first data line DP and the second data line DM return to a state indicating QC2.0 5V, then the fine-tuning charging mode and the QC3.0 state are exited, and the voltage of the output power line VBUS is changed from a voltage-decreasing state to 5V.

It is to be noted that it is possible to exit only the fine-tuning charging mode but still be in the QC3.0 continuous mode. At this time, the voltage of the VBUS is maintained as the last adjusted voltage. As shown in FIG. 11, between time t11-1 and the time t11-2, the DP is about 0.6 V and the DM is about 2.8 V. During this time, the QC3.0 continuous mode is enabled, and the voltage of the VBUS is maintained at about 5.9 V. The voltage is the last fine-tuned voltage before the time t11-1. Similarly, as shown in FIG. 12, between time t12-1 to the time t12-2, the DP is about 0.6 V, the DM is about 2.8 V, and the voltage of the VBUS is maintained at about 3.6 V. In addition, although there is also a fine-tuning pulse between time t12-0 and the time t12-1, since the voltage 3.6V of the VBUS is already the lowest voltage allowable by the QC3.0 protocol, the charger no longer responds to a fine-tuning voltage decrease instruction, but maintains the voltage of the VBUS at 3.6 V at this time.

EXAMPLE 2

In this example, the voltage of the output power line (VBUS) is adjusted by a fast charging method, including increasing voltage and decreasing voltage.

Figure 13:
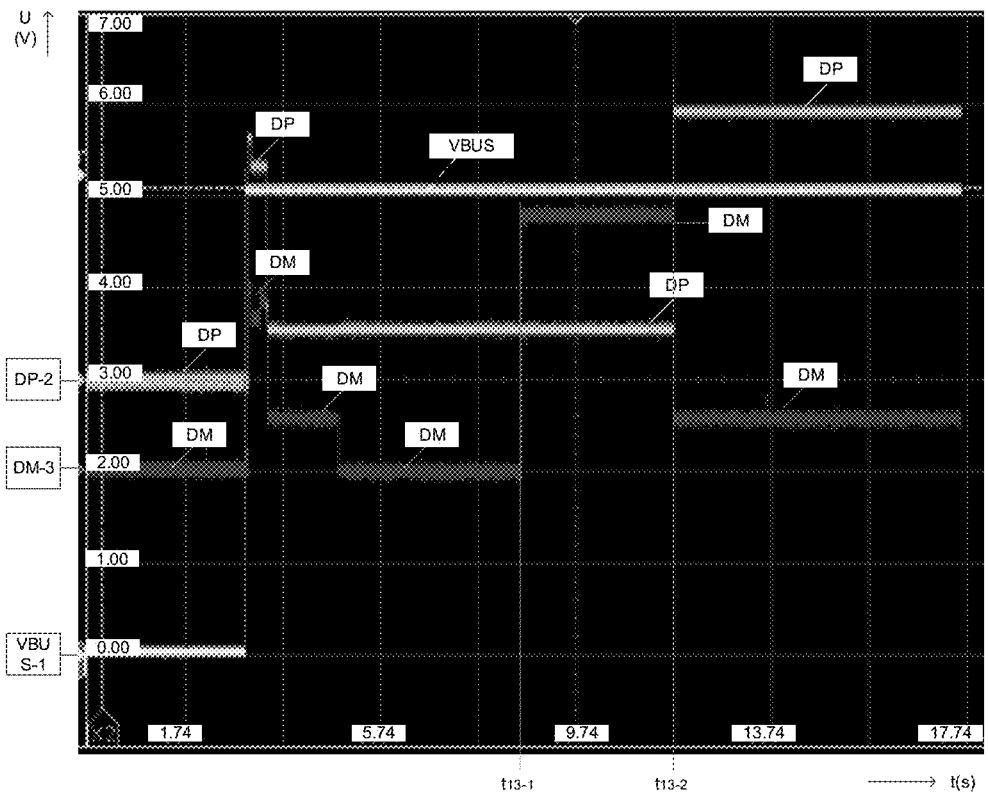
FIG. 13 is a schematic diagram illustrating a time sequence for voltage inversion of a first data line and a second data line in a QC3.0 state according to a second example of the present disclosure.

After a charger enters a QC3.0 state, it is required not to perform any voltage change for at least a time period $T_{mode\_change}$. In an implementation, a maximum value of the time $T_{mode\_change}$ is 60 ms. As shown in FIG. 13, after time t13-1, the DM is about 2.8 V, the DP is about 0.6 V, and a time interval between the time t13-1 and time t13-2 is about 3.5 second, which satisfy the requirement of performing no voltage change during the time period $T_{mode\_change}$. At the time t13-2, the respective voltages of the first data line DP and the second data line DM are flipped at the same time, so that after the time t13-2, the DP is about 3.3 V and the DM is about 0.6 V. After the respective voltages of the DP and the DM flip, it is still required to maintain these voltages for at least the time period $T_{mode\_change}$. Afterwards, the fine-tuning charging mode may be entered. As shown in FIG. 13, after the time t13-2, the DP and the DM keep at the voltages for several seconds, which also satisfy the requirement of maintaining these voltages for at least the time period $T_{mode\_change}$. The time period $T_{mode\_change}$ may be referred to as a first time period.

In this example, the voltage pulses have opposite polarities in the fine-tuning charging mode comparing to the QC3.0 continuous charging mode (i.e., a 200 mV/Step mode). Taking increasing the voltage of the output power line as an example, the second data line DM maintains the first voltage value (0.6 V) and the first data line DP transmits the negative voltage pulses in this example; however, in the QC3.0 continuous charging mode, the second data line DM maintains the second voltage value (3.3 V) and the first data line DP transmits the positive voltage pulses.

1. The voltage of the output power line is increased in the fine-tuning charging mode.

Figure 14:
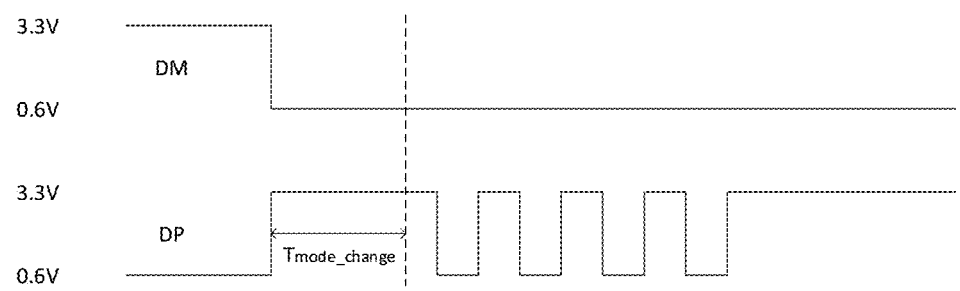
FIG. 14 is a voltage-increasing waveform diagram of a fine-tuning charging mode according to a second example of the present disclosure.
Figure 15:
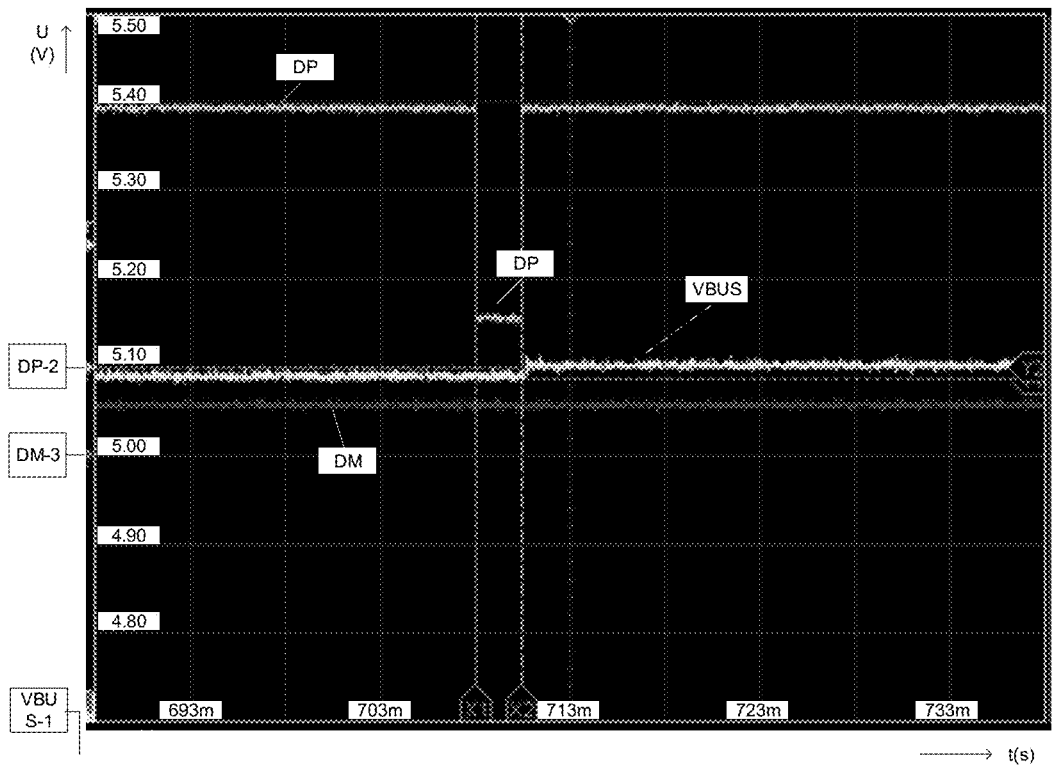
FIG. 15 is a schematic diagram illustrating a time sequence of a first data line and a second data line during a voltage-increasing process according to a second example of the present disclosure.

In this example, as shown in FIG. 14, the second data line DM maintains the first voltage value (0.6 V), and the first data line DP transmits N number of second negative voltage pulses at the same time. A time sequence of the first data line DP and the second data line DM is shown in FIG. 15 illustrating one voltage adjustment step corresponding to one second negative voltage pulse transmitted via the first data line DP.

Figure 18:
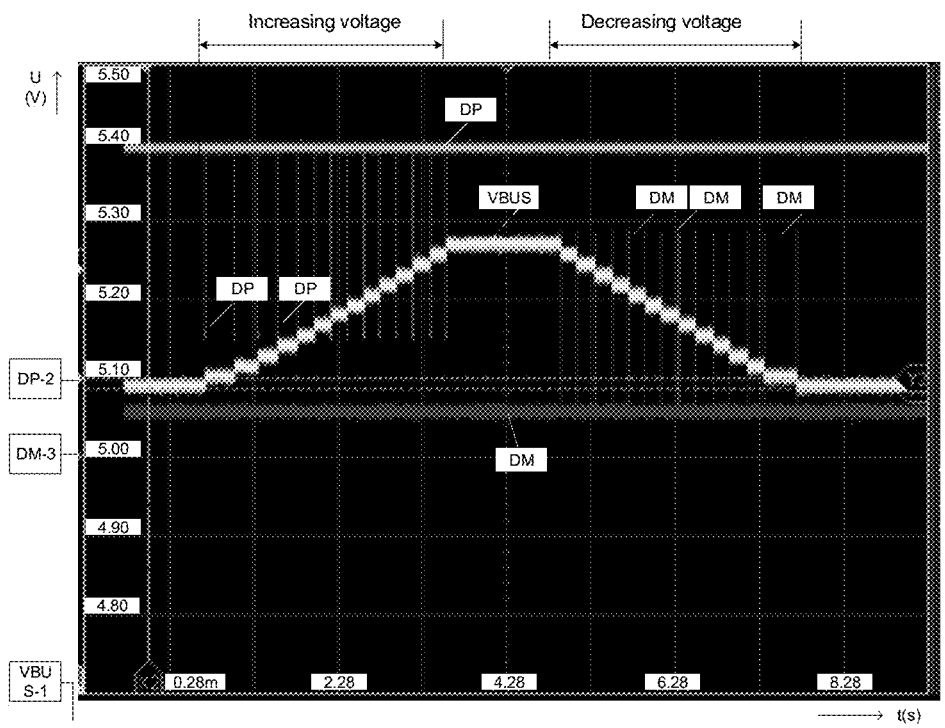
FIG. 18 is a schematic diagram illustrating a voltage-increasing effect and a voltage-decreasing effect according to a second example of the present disclosure.

According to the voltage combination of the first data line DP and the second data line DM, the charger adjusts the output voltage of the output power line VBUS by increasing 12.5 mV per voltage adjustment step for each second negative voltage pulse. A voltage adjustment effect is as shown at the left side of FIG. 18.

2. The voltage of the output power line is decreased in the fine-tuning charging mode.

Figure 16:
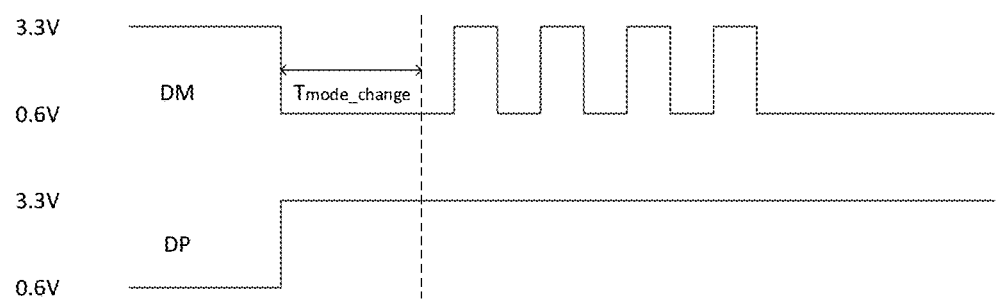
FIG. 16 is a voltage-decreasing waveform diagram of a fine-tuning charging mode according to a second example of the present disclosure.
Figure 17:
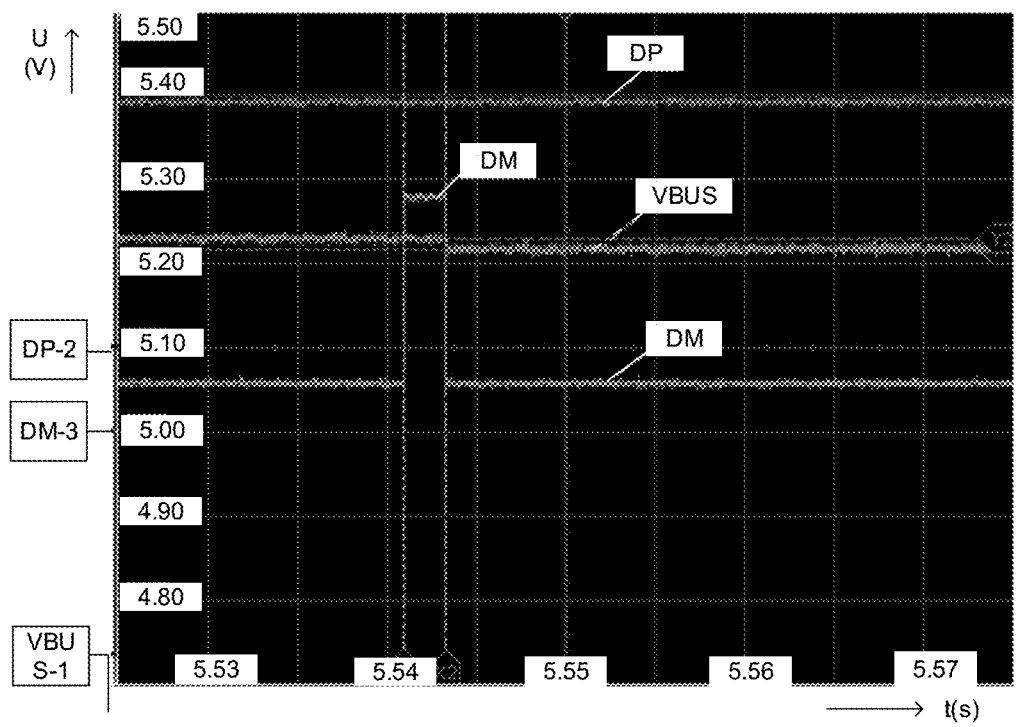
FIG. 17 is a schematic diagram illustrating a time sequence of a first data line and a second data line during a voltage-decreasing process according to a second example of the present disclosure.

In this example, as shown in FIG. 16, the first data line DP maintains the second voltage value (3.3 V), and the second data line DM transmits N number of second positive voltage pulses at the same time. A time sequence of the first data line DP and the second data line DM is as shown in FIG. 17 illustrating one voltage adjustment step corresponding to one second possible voltage pulse transmitted via the second data line DM.

According to the voltage combination of the first data line DP and the second data line DM, the charger adjusts the output voltage of the output power line VBUS by decreasing 12.5 mV per voltage adjustment step for each second positive voltage pulse. A voltage adjustment effect is as shown at the right side of FIG. 18.

3. The fine-tuning charging mode is exited.

Figure 19:
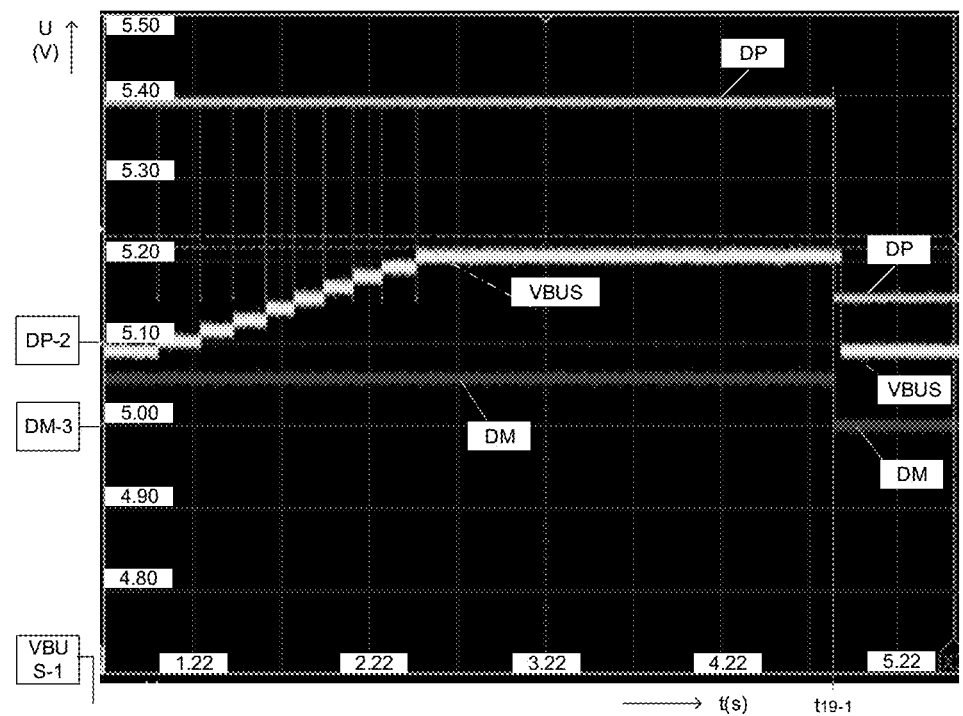
FIG. 19 is a schematic diagram illustrating a time sequence for exiting a fine-tuning charging mode during a voltage-increasing process according to a second example of the present disclosure.

As shown in FIG. 19, at time t19-1, the DP is about 0.6 V, and the DM is about 0 V. At this time, the first data line DP and the second data line DM conform to a state indicating QC2.0 5V, then the fine-tuning charging mode and the QC3.0 state are exited, and the voltage of the output power line VBUS is changed from a voltage increasing state to 5V.

Figure 20:
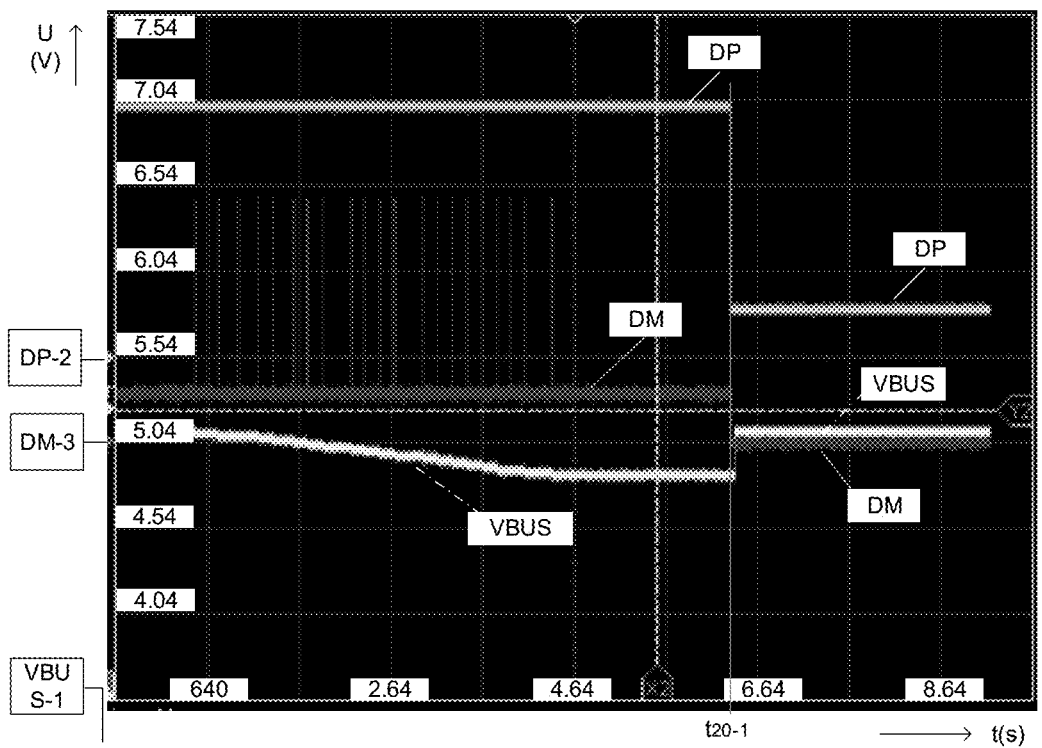
FIG. 20 is a schematic diagram illustrating a time sequence for exiting a fine-tuning charging mode during a voltage-decreasing process according to a second example of the present disclosure.

As shown in FIG. 20, at time t20-1, the DP is about 0.6 V, and the DM is about 0 V. At this time, the first data line DP and the second data line DM conform to a state indicating QC2.0 5V, then the fine-tuning charging mode and the QC3.0 state are exited, and the voltage of the output power line VBUS is changed from a voltage decreasing state to 5V.

Similar to the example 1, it is possible to exit only the fine-tuning charging mode but still be in the QC3.0 continuous mode in the example 2. At this time, the voltage of the VBUS is maintained as the last adjusted voltage.

EXAMPLE 3

Figure 21:
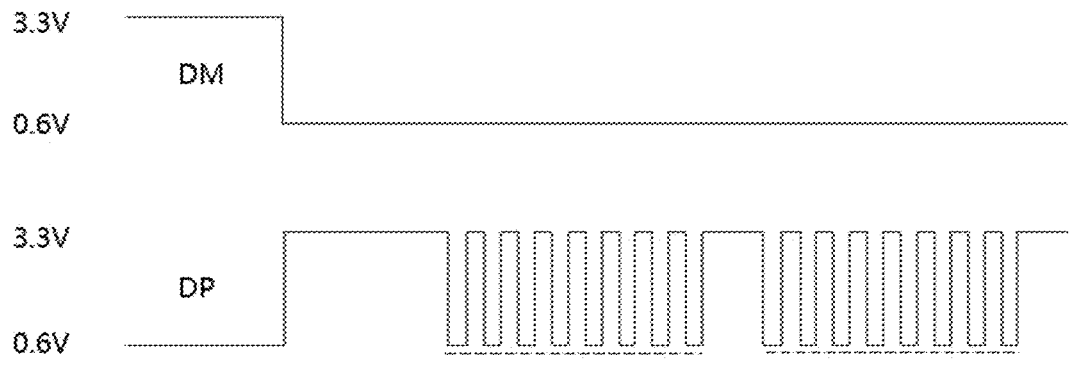
FIG. 21 is a waveform diagram of a communication data packet on a first data line according to a third example of the present disclosure.

After a QC3.0 state is entered, the 0.6 V voltage on the second data line DM is kept unchanged, and a data packet is transmitted via the first data line DP. As shown in FIG. 21, the data packet includes at least two groups of pulse data with an interval of a set time length. The first group of pulse data indicates an output voltage value of the charger, and the second group of pulse data indicates a limiting value of an output current of the charger. The first group of pulse data may be 16 bits, and the voltage of each bit may be defined based on a fine-tuning charging protocol.

According to the examples, the voltage of the output power line may be adjusted in the preset fine-tuning charging mode by obtaining the QC3.0 voltage request of the to-be-charged device when the voltage combination of the first data line and the second data line in the QC3.0 voltage request is the first category valid voltage combination, thereby fast charging the to-be-charged device. Thus, the invalid voltage combination in the QC3.0 charging mode may be used as the first category valid voltage combination corresponding to the fine-tuning charging mode. Different voltage combinations of the first data line and the second data line are fully utilized in the examples. In this way, a utilization rate of the voltage combination can be increased, and the voltage of the output power line is adjusted with a voltage adjustment step size different from that of the QC3.0 charging mode, thereby achieving coarse-tuning or fine-tuning of the charging voltage and satisfying scenarios with different charging requirements. In addition, existing charging cables and interfaces do not need to be upgraded in the examples, and the charger using the method is compatible with to-be-charged devices only supporting the QC2.0/QC3.0 protocols.

Figure 22:
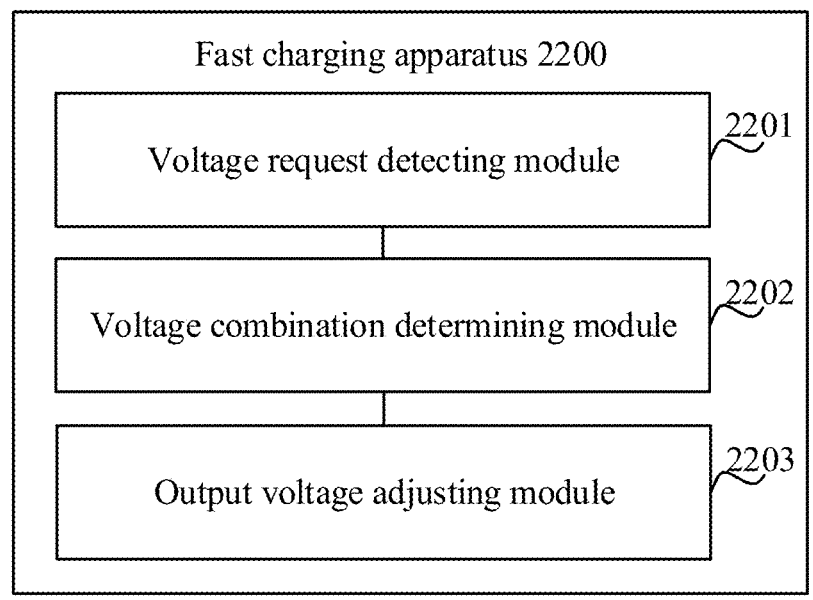
FIG. 22 is a block diagram illustrating a fast charging apparatus according to an example of the present disclosure.

An example of the present disclosure further provides a fast charging apparatus applied to a charger as shown in FIG. 22. The apparatus 2200 includes the following modules.

A voltage request detecting module 2201, configured to monitor a voltage request from a to-be-charged device in response to detecting a successful handshake with a to-be-charged device, where the voltage request includes at least a QC3.0 voltage request.

A voltage combination determining module 2202, configured to determine a voltage combination of a first data line and a second data line according to respective voltage data of the first data line and the second data line in the QC3.0 voltage request when the voltage request is the QC3.0 voltage request.

An output voltage adjusting module 2203, configured to adjust a voltage transmitted via an output power line in a preset fine-tuning charging mode to charge the to-be-charged device when the voltage combination of the first data line and the second data line belongs to a first category valid voltage combination, where a voltage adjustment step size of the fine-tuning charging mode is less than a voltage adjustment step size of a QC3.0 charging mode.

Thus, the invalid voltage combination in the QC3.0 charging mode may be used as the first category valid voltage combination corresponding to the fine-tuning charging mode. Different voltage combinations of the first data line and the second data line are fully utilized in this example. In this way, a utilization rate of the voltage combination can be increased, and the voltage of the output power line is adjusted with a voltage adjustment step size different from that of the QC3.0 charging mode, thereby achieving coarse-tuning or fine-tuning of the charging voltage and satisfying scenarios with different charging requirements. In addition, existing charging cables and interfaces do not need to be upgraded in this example, and the charger using this method can be compatible with to-be-charged devices only supporting the QC2.0/QC3.0 protocols.

Figure 23:
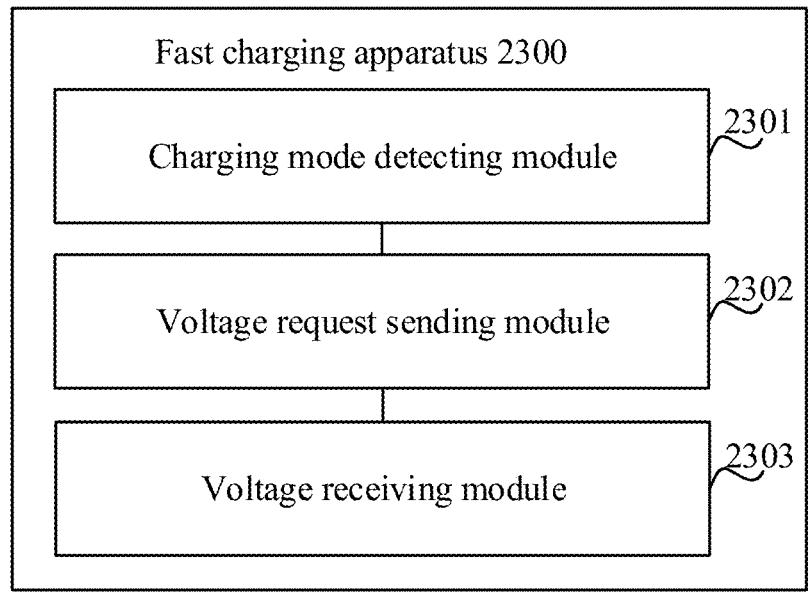
FIG. 23 is a block diagram illustrating a fast charging apparatus according to another example of the present disclosure.

A fast charging apparatus according to an example of the present disclosure, which applies to a charger, includes: a voltage request detecting module, configured to monitor a voltage request from a to-be-charged device in response to detecting a successful handshake with the to-be-charged device, where the voltage request includes at least a QC3.0 voltage request; a voltage combination determining module, configured to determine a voltage combination of a first data line and a second data line according to respective voltage data of the first data line and the second data line in the QC3.0 voltage request when the voltage request is the QC3.0 voltage request; and an output voltage adjusting module, configured to adjust a voltage transmitted via an output power line in a preset fine-tuning charging mode when the voltage combination of the first data line and the second data line belongs to a first category valid voltage combination, where a voltage adjustment step size of the fine-tuning charging mode is less than a voltage adjustment step size of a QC3.0 charging mode An example of the present disclosure further provides a fast charging apparatus applied to a to-be-charged device as shown in FIG. 23. The apparatus 2300 includes the following modules.

A charging mode detecting module 2301, configured to monitor whether a charger supports a fine-tuning charging mode in response to detecting a successful handshake with the charger.

A voltage request sending module 2302, configured to send a QC3.0 voltage request to the charger when the charger supports the fine-tuning charging mode, where the QC3.0 voltage request includes respective voltage data of a first data line and a second data line belonging to a first category valid voltage combination, so that the charger adjusts a voltage transmitted via an output power line in the fine-tuning charging mode when the voltage combination of the first data line and the second data line belongs to a first category valid voltage combination.

A voltage receiving module 2303, configured to charge the to-be-charged device according to a voltage transmitted via the output power line from the charger.

Thus, the invalid voltage combination in the QC3.0 charging mode may be used as the first category valid voltage combination corresponding to the fine-tuning charging mode. Different voltage combinations of the first data line and the second data line are fully utilized in this example. In this way, a utilization rate of the voltage combination can be increased, and the voltage of the output power line is adjusted with a voltage adjustment step size different from that of the QC3.0 charging mode, thereby achieving coarse-tuning or fine-tuning of the charging voltage and satisfying a scenario with a more precise charging requirement.

A fast charging apparatus according to an example of the present disclosure, which applies to a to-be-charged device, includes: a charging mode detecting module, configured to monitor whether a charger supports a fine-tuning charging mode in response to detecting a successful handshake with the charger; a voltage request sending module, configured to send a QC3.0 voltage request to the charger when the charger supports the fine-tuning charging mode, where the QC3.0 voltage request includes respective voltage data of a first data line and a second data line belonging to a first category valid voltage combination; and a voltage receiving module, configured to charge the to-be-charged device according to a voltage transmitted via an output power line from the charger.

It is to be understood that the fast charging apparatuses according to the examples of the present disclosure correspond to the above fast charging methods, and specific contents of the apparatuses may be referred to the contents of corresponding method examples, which will not be described again.

Figure 24:
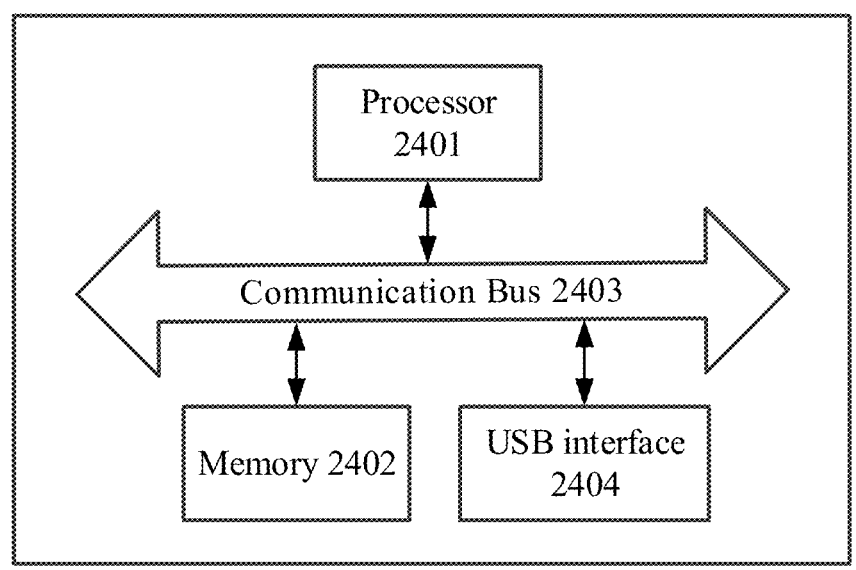
FIG. 24 is a block diagram illustrating a fast charging device according to an example of the present disclosure.

An example of the present disclosure further provides a fast charging device 2400. The fast charging device 2400 may be applied to a charger. As shown in FIG. 24, the fast charging device 2400 includes a processor 2401 and a memory 2402 storing instructions executable by the processor 2401. And the fast charging device 2400 may also include a communication bus 2403 and a USB interface 2404. The processor 2401, the memory 2402 and the USB interface 2404 are connected to each other through the communication bus 2403.

The processor 2401 is configured to read the executable instructions stored in the memory 2402 to: in response to detecting a successful handshake with a to-be-charged device is detected, monitor a voltage request from the to-be-charged device, where the voltage request includes at least a QC3.0 voltage request; when the voltage request is the QC3.0 voltage request, determine a voltage combination of a first data line and a second data line according to respective voltage data of the first data line and the second data line in the QC3.0 voltage request; and when the voltage combination of the first data line and the second data line belongs to a first category valid voltage combination, adjust a voltage transmitted via an output power line in a preset fine-tuning charging mode, where a voltage adjustment step size of the fine-tuning charging mode is less than a voltage adjustment step size of a QC3.0 charging mode, and the first category valid voltage combination corresponds to an invalid voltage combination in the QC3.0 charging mode.

An example of the present disclosure further provides a fast charging device 2400. The fast charging device 2400 may be applied to a to-be-charged device. As shown in FIG. 24, the fast charging device 2400 includes a processor 2401 and a memory 2402 storing instructions executable by the processor 2401. And the fast charging device 2400 may also include a communication bus 2403 and a USB interface 2404. The processor 2401, the memory 2402 and the USB interface 2404 are connected to each other through the communication bus 2403.

The processor 2401 is configured to read the executable instructions stored in the memory 2402 to: in response to detecting a successful handshake with a charger, monitor whether the charger supports a fine-tuning charging mode, where a voltage adjustment step size of the fine-tuning charging mode is less than a voltage adjustment step size of a QC3.0 charging mode; when the charger supports the fine-tuning charging mode, send a QC3.0 voltage request to the charger, where the QC3.0 voltage request includes respective voltage data of a first data line and a second data line belonging to a first category valid voltage combination, where the first category valid voltage combination corresponds to an invalid voltage combination in the QC3.0 charging mode; and charge the to-be-charged device according to a voltage transmitted via an output power line from the charger.

An example of the present disclosure further provides a non-transitory machine-readable storage medium storing instructions. The non-transitory machine-readable storage medium may be a read-only memory (ROM), a CD-ROM, a magnetic tape, a floppy disk, an optical data storage device, and the like. The instructions may be executed by a processor to implement the fast charging methods applied to a charger.

An example of the present disclosure further provides a non-transitory machine-readable storage medium storing instructions. The non-transitory machine-readable storage medium may be a read-only memory (ROM), a CD-ROM, a magnetic tape, a floppy disk, an optical data storage device, and the like. The instructions may be executed by a processor to implement the fast charging methods applied to a to-be-charged device.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

After considering the specification and practicing the present disclosure, the persons of skill in the art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the art not disclosed in the present disclosure. The specification and examples herein are intended to be illustrative only.

It is to be understood that the present disclosure is not limited to the precise structures described above and shown in the accompanying drawings and may be modified or changed without departing from the scope of the present disclosure.

What is claimed is:

1. A fast charging method, the method being applied to a charger, comprising:
   in response to detecting a successful handshake with a to-be-charged device, monitoring a voltage request from the to-be-charged device, wherein the voltage request comprises at least a Quick Charge 3.0 (QC3.0) voltage request;
   when the voltage request is the QC3.0 voltage request, determining a voltage combination of a first data line and a second data line according to respective voltage data of the first data line and the second data line in the QC3.0 voltage request; and
   when the voltage combination of the first data line and the second data line belongs to a first category valid voltage combination, adjusting a voltage transmitted via an output power line of the charger in a preset fine-tuning charging mode, wherein a voltage adjustment step size of the fine-tuning charging mode is less than a voltage adjustment step size of a QC3.0 charging mode, and the first category valid voltage combination corresponds to an invalid voltage combination in the QC3.0 charging mode.

2. The fast charging method of claim 1, wherein,
   the QC3.0 voltage request is obtained by detecting respective voltages of the first data line and the second data line; or
   the QC3.0 voltage request is obtained according to a data packet transmitted via the first data line, wherein the data packet comprises at least two groups of pulse data, a first group of the pulse data indicates an output voltage value of the charger, and a second group of the pulse data indicates a limiting value of an output current of the charger.

3. The fast charging method of claim 1, wherein adjusting the voltage transmitted via the output power line in the preset fine-tuning charging mode comprises:
   when the second data line transmits a first negative voltage pulse and the first data line transmits N number of second positive voltage pulses, increasing the voltage transmitted via the output power line with the voltage adjustment step size of the fine-tuning charging mode, wherein a width of the first negative voltage pulse is greater than a width of the N number of the second positive voltage pulses; or
   when the first data line transmits a first positive voltage pulse and the second data line transmits N number of second negative voltage pulses, decreasing the voltage transmitted via the output power line with the voltage adjustment step size of the fine-tuning charging mode, wherein a width of the first positive voltage pulse is greater than a width of the N number of the second negative voltage pulses; and wherein the N indicates a number of the voltage adjustments.

4. The fast charging method of claim 3, wherein a time interval from a falling edge of the first negative voltage pulse transmitted via the second data line to a first rising edge of the second positive voltage pulses transmitted via the first data line is less than a minimum value of filtering time defined in a continuous mode of the QC3.0 charging mode; and a time interval from a rising edge of the first positive voltage pulse transmitted via the first data line to a first falling edge of the second negative voltage pulses transmitted via the second data line is less than the minimum value of the filtering time defined in the continuous mode of the QC3.0 charging mode.

5. The fast charging method of claim 1, further comprising:

when the voltage combination of the first data line and the second data line belongs to a second category valid voltage combination, charging the to-be-charged device based on the QC3.0 charging mode; and when the voltage combination of the first data line and the second data line belongs to neither the first category valid voltage combination nor the second category valid voltage combination, maintaining a current charging state;

wherein the second category valid voltage combination corresponds to a valid voltage combination in the QC3.0 charging mode.

6. The fast charging method of claim 1, further comprising:

when the voltage transmitted via the first data line is lower than a third voltage value or the respective voltages of the first data line and the second data line indicate a state of QC2.0 5V, exiting from the fine-tuning charging mode and a QC3.0 state.

7. The fast charging method of claim 1, wherein adjusting the voltage transmitted via the output power line in the preset fine-tuning charging mode comprises:

in response to the voltage transmitted via the first data line being changed from a first voltage value to a second voltage value and the voltage transmitted via the second data line being changed from the second voltage value to the first voltage value, waiting for a first time period, when the first data line transmits N number of second negative voltage pulses and the second data line maintains the first voltage value, increasing the voltage transmitted via the output power line with the voltage adjustment step size of the fine-tuning charging mode;

when the first data line maintains the second voltage value and the second data line transmits N number of second positive voltage pulses, decreasing the voltage transmitted via the output power line with the voltage adjustment step size of the fine-tuning charging mode; and wherein the N indicates a number of the voltage adjustments.

8. The fast charging method of claim 7, further comprising:

when the respective voltages of the first data line and the second data line indicate a state of QC2.0 5V, exiting from the fine-tuning charging mode and a QC3.0 state.

9. A non-transitory machine-readable storage medium storing instructions, wherein the instructions are executed by a processor to implement the method of claim 1.

10. A fast charging method, the method being applied to a to-be-charged device, and comprising:

in response to detecting a successful handshake with a charger, monitoring whether the charger supports a fine-tuning charging mode, wherein a voltage adjustment step size of the fine-tuning charging mode is less than a voltage adjustment step size of a Quick Charge 3.0 (QC3.0) charging mode;

when the charger supports the fine-tuning charging mode, sending a QC3.0 voltage request to the charger, wherein the QC3.0 voltage request comprises respective voltage data of a first data line and a second data line belonging to a first category valid voltage combination, wherein the first category valid voltage combination corresponds to an invalid voltage combination in the QC3.0 charging mode; and charging the to-be-charged device according to a voltage transmitted via an output power line from the charger.

11. The fast charging method of claim 10, wherein:

the QC3.0 voltage request is output by controlling respective voltages of the first data line and the second data line; or the QC3.0 voltage request is output by the first data line in a form of data packet, wherein the data packet comprises at least two groups of pulse data, a first group of the pulse data indicates an output voltage value of the charger, and a second group of the pulse data indicates a limiting value of an output current of the charger.

12. The fast charging method of claim 10, wherein the first category valid voltage combination comprises at least one of the following:

the second data line outputs a first negative voltage pulse and the first data line outputs N number of second positive voltage pulses, wherein a width of the first negative voltage pulse is greater than a width of the N number of the second positive voltage pulses;

the first data line outputs a first positive voltage pulse and the second data line outputs N number of second negative voltage pulses, wherein a width of the first positive voltage pulse is greater than a width of the N number of the second negative voltage pulses;

the first data line outputs N number of the second negative voltage pulses and the second data line maintains a first voltage value;

the first data line maintains a second voltage value and the second data line outputs N number of the second positive voltage pulses; and the second data line outputs the first voltage value and the first data line outputs at least two groups of third negative voltage pulses, wherein each group comprises a plurality of third negative voltage pulses.

13. The fast charging method of claim 10, further comprising:

exiting from the fine-tuning charging mode and a QC3.0 state by setting the voltage of the first data line lower than a third voltage value.

14. The fast charging method of claim 10, further comprising:
exiting from the fine-tuning charging mode and a QC3.0 state by setting the respective voltages of the first data line and the second data line to a state of QC2.0 5V.

15. A non-transitory machine-readable storage medium storing instructions, wherein the instructions are executed by a processor to implement the method of claim 10.

16. A fast charging apparatus, comprising:
a processor; and
a memory storing instructions executable by the processor,
wherein the processor is caused by executing the instructions stored in the memory to:
in response to detecting a successful handshake with a to-be-charged device, monitor a voltage request from the to-be-charged device, wherein the voltage request comprises at least a Quick Charge 3.0 (QC3.0) voltage request;
when the voltage request is the QC3.0 voltage request, determine a voltage combination of a first data line and a second data line according to respective voltage data of the first data line and the second data line in the QC3.0 voltage request; and
when the voltage combination of the first data line and the second data line belongs to a first category valid voltage combination, adjust a voltage transmitted via an output power line of the apparatus in a preset fine-tuning charging mode, wherein a voltage adjustment step size of the fine-tuning charging mode is less than a voltage adjustment step size of a QC3.0 charging mode, and the first category valid voltage combination corresponds to an invalid voltage combination in the QC3.0 charging mode.

17. The fast charging apparatus of claim 16, wherein the processor is further configured to:
when the voltage combination of the first data line and the second data line belongs to a second category valid voltage combination, charge the to-be-charged device based on the QC3.0 charging mode; and
when the voltage combination of the first data line and the second data line belongs to neither the first category valid voltage combination nor the second category valid voltage combination, maintain a current charging state;
wherein the second category valid voltage combination corresponds to a valid voltage combination in the QC3.0 charging mode.

18. The fast charging apparatus of claim 16, wherein the processor is further configured to:
when the second data line transmits a first negative voltage pulse and the first data line transmits N number of second positive voltage pulses, increase the voltage transmitted via the output power line with the voltage adjustment step size of the fine-tuning charging mode, wherein a width of the first negative voltage pulse is greater than a width of the N number of the second positive voltage pulses; or
when the first data line transmits a first positive voltage pulse and the second data line transmits N number of second negative voltage pulses, decrease the voltage transmitted via the output power line with the voltage adjustment step size of the fine-tuning charging mode, wherein a width of the first positive voltage pulse is greater than a width of the N number of the second negative voltage pulses; and
wherein the N indicates a number of the voltage adjustments.

19. A fast charging apparatus, comprising:
a processor; and
a memory storing instructions executable by the processor,
wherein the processor is caused by executing the instructions stored in the memory to:
in response to detecting a successful handshake with a charger, monitor whether the charger supports a fine-tuning charging mode, wherein a voltage adjustment step size of the fine-tuning charging mode is less than a voltage adjustment step size of a Quick Charge 3.0 (QC3.0) charging mode;
when the charger supports the fine-tuning charging mode, send a QC3.0 voltage request to the charger, wherein the QC3.0 voltage request comprises respective voltage data of a first data line and a second data line belonging to a first category valid voltage combination, wherein the first category valid voltage combination corresponds to an invalid voltage combination in the QC3.0 charging mode; and
charge the apparatus according to a voltage transmitted via an output power line from the charger.

20. The fast charging apparatus of claim 19, wherein:
the QC3.0 voltage request is output by controlling respective voltages of the first data line and the second data line; or
the QC3.0 voltage request is output by the first data line in a form of data packet, wherein the data packet comprises at least two groups of pulse data, a first group of the pulse data indicates an output voltage value of the charger, and a second group of the pulse data indicates a limiting value of an output current of the charger.

* * * * *